Feb. 18, 1964 L. G. SIMJIAN 3,121,363
RECEIPT GIVING MACHINE
Original Filed Nov. 6, 1958 2 Sheets-Sheet 1
FIG. 1
FIG. 2
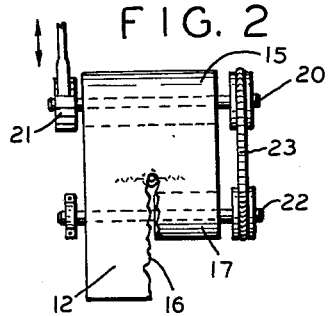
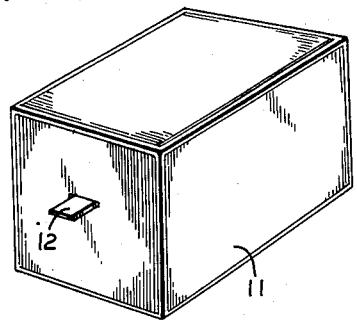
FIG. 3
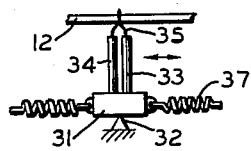
FIG. 4
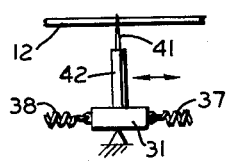
FIG. 5
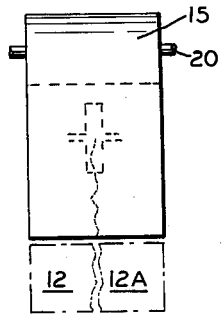
FIG. 6
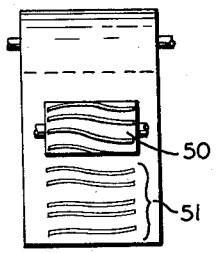
FIG. 7
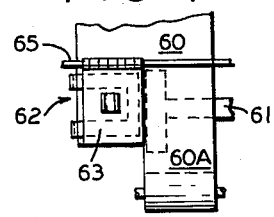
FIG. 8
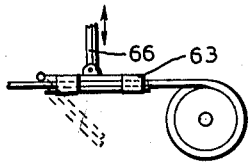
FIG. 9
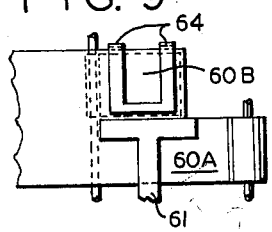
*INVENTOR.*
LUTHER G. SIMJIAN
BY Erwin B. Steinberg
AGENT.

Feb. 18, 1964     L. G. SIMJIAN     3,121,363
RECEIPT GIVING MACHINE
Original Filed Nov. 6, 1958     2 Sheets-Sheet 2

*INVENTOR.*
LUTHER G. SIMJIAN
BY
Erwin B. Steinberg
AGENT.

United States Patent Office

3,121,363
Patented Feb. 18, 1964

3,121,363
RECEIPT GIVING MACHINE
Luther G. Simjian, Greenwich, Conn., assignor to Universal Match Corporation, Ferguson, Mo., a corporation of Delaware
Continuation of application Ser. No. 772,204, Nov. 6, 1958. This application Dec. 7, 1960, Ser. No. 75,065
9 Claims. (Cl. 83—428)

This application is a continuation of my copending application Serial No. 772,204, filed November 6, 1958, for improvements in "Receipt Giving Machine," now abandoned.

This invention in general is related to a device for automatically giving a receipt and more particularly, refers to a machine for dispensing a receipt which is coded along a disjunction with respect to another receipt portion.

Receipt giving machines are well known in the art, primarily machines which issue a printed or punched receipt for the purpose of identifying a person, a deposit, or ownership in general. Sometimes the receipts to avoid forgery are printed on special paper, embody special inks, carry peculiar designs or fanciful printing. In spite of such precautions, none of these receipts are completely proof from forgery.

The instant device intends to overcome these shortcomings by dispensing a receipt which has what may be termed a "coded" border which matches with a similar border on another receipt, the latter being either stored within the machine or retained by a party to whom, for identification purposes, the dispensed receipt is presented. Such a coded border may be produced conveniently by cutting or tearing a receipt into two parts in a manner causing both parts to become separated by an irregularly shaped, but matching, disjunction. An irregular disjunction cannot readily be duplicated or forged since little can be done in the way of doctoring such a border without the effects thereof becoming immediately apparent.

One of the objects of this invention therefore is the provision of an improved receipt giving machine which avoids one or more of the shortcomings and limitations of prior art devices.

Another object of this invention is the provision of a receipt giving machine which issues a ticket having an irregular disjunction forming a coded border.

Another object of this invention is the provision of a receipt giving machine which dispenses a receipt and retains another receipt, both receipts being provided with a matching coded border.

Still another object of this invention is the provision of a machine which issues a receipt having a coded border thereby providing a substantially tamper-proof receipt which must be presented for identification purposes.

Further and still other objects of this invention will be apparent by reference to the following description taken in conjunction with the accompanying drawings in which:

FIGURE 1 is a perspective view of the receipt giving machine;

FIGURE 2 is a plan view of some of the internal parts of the machine when the outside enclosure is removed;

FIGURE 3 shows a mechanism for effecting the coded border;

FIGURE 4 illustrates an alternative mechanism which may be used to effect a coded border;

FIGURE 5 is a plan view illustrating a further alternative arrangement of FIGURE 2;

FIGURE 6 depicts a mechanism useful for imprinting the receipts with a design;

FIGURE 7 is a top view of an arrangement for effecting a disjunction within the receipt;

FIGURE 8 is an elevational view of FIGURE 7;

FIGURE 9 is a bottom view of FIGURE 7;

Figure 10:
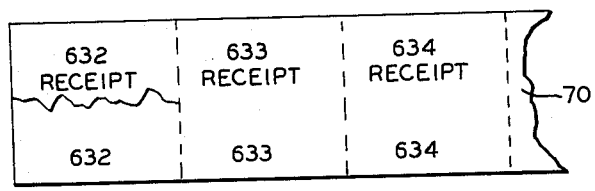
FIGURE 10 is a plan view of a series of receipts.

Referring now to FIGURE 1, numeral 11 identifies an enclosure which encloses substantially all of the active portions of the receipt giving machine. A receipt 12 is rendered available to a depositor or patron using the instant device at or near the front of the machine.

The internal mechanism is shown more clearly in FIGURE 2 wherein a roll of paper 15 is unwound to eject from the enclosure 11 a portion of a receipt 12 which is made available to the person using the machine. It will be noted that receipt 12 is provided at one of its longitudinal borders with an irregular edge 16 which severance matches with a similar portion of a receipt wound on drum 17 and retained, in this instance, within the machine. It will be obvious that if this border is established in an irregular and random fashion, it constitutes a coded border which matches only with a definite corresponding portion. Both corresponding portions when aligned edge to edge along this border form an entity and in this manner, receipt 12 is completely identifiable by its complementary and matching portion. Both receipts additionally may be provided with data such as a serial number, date, or a photographic image as will be explained later.

Roll 15 is supported on a shaft 20 which for each dispensing operation is actuated by a lever and ratchet mechanism 21, such as is well known in the art. Rotation of shaft 20 is transmitted to shaft 22 by means of a spring belt 23 to permit slippage which is required as one roll becomes smaller and the other roll increases in diameter thereby necessitating differential shaft speeds.

Typical means for effecting the longitudinal coded border are shown in FIGURES 3 and 4. In FIGURE 3, a support block 31 riding on a knife edge 32 supports two upstanding filament posts 33 and 34. Between these filament posts there is mounted a hot wire filament 35 which becomes energized for severing the receipt. If the receipt is made of a paper or plastic base, the filament 35 will burn through the thickness of the receipt and sever the receipt so as to provide a first and a second receipt portion, one of which is given to the depositor. Engaging the support block 31 there are two springs 37 and 38 which become excited by vibration from the ratchet mechanism 21 and which in turn, cause block 31 to oscillate laterally in a random manner thereby causing the irregular border to become established on the receipt.

FIGURE 4 shows a similar construction except that a small slitting knife 41 mounted in a holder 42 is supported within a block 31. Again, the knife will sever the receipt to provide two portions which must be matched at an irregular border. It will be apparent that instead of springs 38 and 37 which are caused to oscillate, applying lateral undulations, cam means may be used which drive block 31 laterally in a non-repetitive or random manner without deviating from the principle described.

FIGURE 5 shows an alternate arrangement of the mechanism when instead of retaining a portion of the receipt, both receipt portions, numerals 12 and 12A, are dispensed from the machine. In this arrangement one portion may be given to the depositor while another portion may be filed with documents, merchandise, articles of value, etc. Transverse cutting of the receipt may be effected in many ways, for instance a further knife (not shown) may cause a transverse cut or by providing a sharp or serrated edge at the front cover, the person using the machine may be instructed to tear the receipt against the edge. Moreover, the roll of receipts may be periodically perforated. Also, fan-folded receipts may be used instead of roll 15 or, if desired, packaged individual tickets may be substituted.

In FIGURE 6 a printing roller 50 is equipped with transverse lines of distinct but irregular design so that the receipt is provided with a plurality of curved transverse lines 51. It will be apparent that other designs may be imprinted which are useful for coding purposes. By having imprinted such a design, the receipt may then be severed into two portions by either a straight or an irregular border since aside from the border itself, the pattern, that is the continuation of the transverse design, must match to provide complete identification. Obviously the roll of receipt paper may be imprinted in advance, provided with water marks, or carry certain other identifying markings.

FIGURES 7, 8 and 9 show another mechanism which may be used to effect severing of the receipt to provide two portions. The width of a roll of receipt paper 60 is fed forward so that one portion becomes supported on a stationary support 61 while the other portion, left portion, is fed through a hingedly mounted cover 62. Cover 62 comprises a top plate 63 and a U-shaped bottom frame 64 between which there is confined receipt portion 60B. Top plate 63 and frame 64 forming an entity are mounted for pivotal rotation about a hinge 65. Plate 63 is actuated by a vertical lifting rod 66 which causes the plate to move in vertical direction.

Normally, plate 62 is held in the same plane as support 61. When severing of the receipt is desired so as to establish a portion 60A and another portion 60B, plate 63 together with the U-shaped frame 64 is pivoted about hinge 65, thereby causing lengthwise tearing of the ticket along the parting line between stationary support 61 and plate 63. If the edge of support 61 along which the tearing takes place is relatively dull, the receipt will tear with a frayed and random border.

Lifting rod 66 is driven by an eccentric drive (not shown) to return plate 63 to its normal position. Subsequently ratchet mechanism 21 is actuated to eject the severed receipt portion.

FIGURE 10 is a close-up view of a series of tickets 70, each ticket being imprinted with a serial number and other identification data. One of the receipts depicts a severance line along which both portions must match in order to establish identity.

Figure 11:
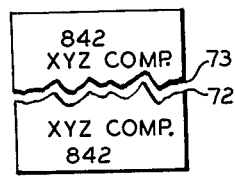
FIGURE 11 is a close-up view of two associated receipt portions having matching coded borders.

FIGURE 11 is a close-up view of a single receipt with numerals 72 and 73 identifying the coded borders. When both receipt portions are placed in contiguity along these borders unmistakable proof is obtained because both receipt portions form an entity.

Figure 12:
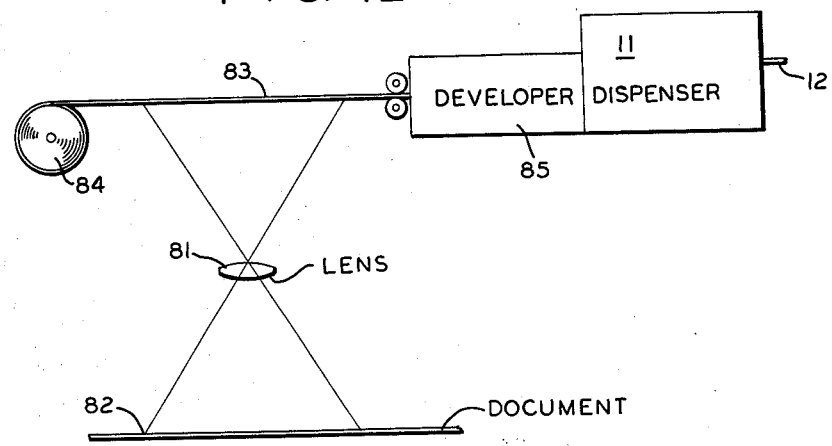
FIGURE 12 is a diagrammatic view of an arrangement for dispensing photographic receipts.

FIGURE 12 shows a variation of the arrangement which may be used when the receipt to be dispensed is to comprise a photograph or a photographic print of a deposit. By means of a lens 81 information from a document or article 82 is transferred onto a sensitized medium 83 which is unwound from a roll 84. The sensitized and exposed medium such as photographic paper is quickly processed in a developer 85 and then transported to the receipt giving machine 11 (FIGURE 1) from where receipt 12 is issued to a person using the machine. In this manner, the receipt may comprise an actual photograph of certain documents or articles and a similar receipt which may or may not carry photographic data will remain within the machine or may be issued for filing purposes as explained hereinbefore. Obviously electronic scanning means may be substituted for photographic transferring of information.

It will be apparent that the device disclosed hereinbefore may be used as an entity in itself or may be used as an attachment to other machines such as depository devices. In every instance, the purpose will be to provide a device which dispenses a receipt portion having a coded border which must match with a similar border on another receipt portion so that when both receipts are placed in contiguity along the coded border, the two receipts form an entity.

While there have been described certain embodiments of the present invention, it will be apparent to those skilled in the art that various changes and modifications may be made therein without deviating from the principle and spirit of the present invention which shall be limited only by the scope of the appended claims.

What is claimed is:

1. In a receipt giving machine the combination of means for supporting a receipt;
  severing means cooperating with said supporting means for severing the receipt into a first and a second portion;
  moving means for causing relative movement along a first axis between the receipt and said severing means;
  said severing means exerting a force having a constant vector along said first axis and a randomly irregular vector along a second axis displaced from said first axis, thereby severing the receipt along a line of severance which is irregularly and randomly undulated; and
  means for retaining the first portion in said machine and dispensing the second portion.

2. In a receipt giving machine, the combination of means for supporting a receipt;
  severing means cooperating with said supporting means for severing the receipt into a first and a second portion;
  moving means for causing relative movement along a first axis between the receipt and said severing means, thereby causing said severing means to sever the receipt;
  undulation means coupled to said severing means for causing said severing means to undergo irregular and random movement along a second axis which is displaced from said first axis, thereby causing the line of severance to become irregularly and randomly undulated; and
  means for retaining the first portion in said machine and dispensing the second portion.

3. In a receipt giving machine, the combination of an enclosure;
  an aperture in said enclosure;
  a supply of tape material disposed in said enclosure;
  tape severing means disposed in said enclosure and engaging said tape material;
  drive means coupled to said tape material, for causing relative movement along a first axis between said tape material and said severing means;
  said severing means exerting a force having a constant vector along said first axis and a randomly irregular vector along a second axis displaced from said first axis, thereby severing said tape material along a line of severance which is irregularly and randomly undulated into a first and a second portion; and
  means guiding said first severed portion through said aperture out of said enclosure to serve as a receipt, and retaining said second portion within said enclosure.

4. In a receipt giving machine the combination of an enclosure;
  an aperture in said enclosure;
  means disposed in said enclosure for supplying tape material;
  tape severing means disposed in said enclosure and engaging the tape material;
  drive means coupled to the tape material for causing relative movement along a first axis between the tape material and said severing means, thereby causing said severing means to sever the tape material into a first and a second portion;
  undulation means coupled to said severing means for causing said severing means to undergo irregular and random movement along a second axis which is displaced from said first axis, thereby causing the line of severance to become irregularly and randomly undulated; and means guiding said first severed portion through said aperture out of said enclosure to serve as a receipt, and retaining said second portion within said enclosure.

5. The machine according to claim 4 wherein said severing means includes a slitting element.

6. The machine according to claim 4 wherein said severing means includes a heated slitting element.

7. The machine according to claim 4 wherein said undulation means includes an oscillating means.

8. The machine according to claim 4 wherein said undulation means includes a resonant oscillating means.

9. The machine according to claim 4 wherein said undulation means includes a cam means.

References Cited in the file of this patent

UNITED STATES PATENTS

| | | |
|---|---|---|
| 950,482 | Hoberg | Mar. 1, 1910 |
| 1,010,577 | Bolli | Dec. 5, 1911 |
| 2,026,754 | Stafford | Jan. 7, 1936 |
| 2,122,254 | Kranich et al. | June 28, 1938 |
| 2,181,435 | Loris | Nov. 28, 1939 |
| 2,309,398 | Keller | Jan. 26, 1943 |
| 2,585,945 | Laing | Feb. 19, 1952 |
| 2,613,742 | McGhan et al. | Oct. 14, 1952 |
| 2,671,389 | Land | Mar. 9, 1954 |
| 2,781,839 | Bockrath et al. | Feb. 19, 1957 |
| 2,913,160 | Fleming | Nov. 17, 1959 |

FOREIGN PATENTS

| | | |
|---|---|---|
| 52,550 | Switzerland | Sept. 1910 |
| 257,098 | Germany | Feb. 28, 1913 |
| 185,156 | Switzerland | Oct. 1, 1936 |